US012592325B2

(12) United States Patent
Pouvreau et al.

(10) Patent No.: US 12,592,325 B2
(45) Date of Patent: Mar. 31, 2026

(54) LIQUID METAL COOLED NUCLEAR REACTOR COMPRISING A PASSIVE DECAY HEAT REMOVAL SYSTEM HAVING THERMAL INSULATION ATTACHED TO A WALL OF A COLD SOURCE RESERVOIR THAT HOLDS A PHASE CHANGE MATERIAL, WHERE THE INSULATION IS ARRANGED TO AUTOMATICALLY FALL BY GRAVITY FROM THE WALL IN RESPONSE TO THE WALL REACHING A PREDETERMINED TEMPERATURE

(71) Applicant: COMMISSARIAT A L'ENERGIE ATOMIQUE ET AUX ENERGIES ALTERNATIVES, Paris (FR)

(72) Inventors: Jérôme Pouvreau, Grenoble (FR); Laurent Brissonneau, Saint Paul Lez Durance (FR); Alessandro Pantano, Saint Paul Lez Durance (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 644 days.

(21) Appl. No.: 18/066,405

(22) Filed: Dec. 15, 2022

(65) Prior Publication Data

US 2023/0197301 A1 Jun. 22, 2023

(30) Foreign Application Priority Data

Dec. 16, 2021 (FR) ..................................... 21 13633

(51) Int. Cl.
*G21C 15/18* (2006.01)
*G21C 1/03* (2006.01)
(Continued)

(52) U.S. Cl.
CPC ............... *G21C 15/18* (2013.01); *G21C 1/03* (2013.01); *G21C 13/024* (2013.01); *G21C 15/14* (2013.01); *G21C 15/182* (2013.01); *G21C 15/247* (2013.01)

(58) Field of Classification Search
CPC ........ G21C 15/18; G21C 1/03; G21C 13/024; G21C 15/14; G21C 15/182; G21C 15/247
(Continued)

(56) References Cited

U.S. PATENT DOCUMENTS 3,888,730 A * 6/1975 Jackson ................ G21C 15/12
376/290
2021/0210229 A1 7/2021 Gauthe et al.
(Continued)

FOREIGN PATENT DOCUMENTS

CN 103923612 B 10/2017
FR 3 104 311 A1 6/2021
(Continued)

OTHER PUBLICATIONS

French Preliminary Search Report Issued May 11, 2022 in French Application 21 13633 filed on Dec. 16, 2021 (with English Translation of Categories of Cited Documents), citing documents 1, 15, & 16 therein, 3 pages.

*Primary Examiner* — Jack W Keith
*Assistant Examiner* — Daniel Wasil
(74) *Attorney, Agent, or Firm* — Oblon, McClelland, Maier & Neustadt, L.L.P.

(57) ABSTRACT

A liquid metal cooled nuclear reactor includes a passive decay heat removal system having thermal insulation attached to a wall of a cold source reservoir that holds a phase change material, where the insulation is arranged to automatically fall by gravity from the wall in response to the wall reaching a predetermined temperature. The nuclear
(Continued)

reactor may be a fast neutron reactor that incorporates an integral system having a final cold source with a reservoir incorporating an integral exchanger divided into a plurality of parallel tubes between which a phase change material is inserted, the reservoir being surrounded by a thermal insulating layer that can be detached in a passive manner in the event of reaching a predetermined threshold temperature.

14 Claims, 10 Drawing Sheets

(51) Int. Cl.
*G21C 13/024* (2006.01)
*G21C 15/14* (2006.01)
*G21C 15/247* (2006.01)

(58) Field of Classification Search
USPC .......................................... 376/282, 298, 299
See application file for complete search history.

(56) References Cited

U.S. PATENT DOCUMENTS

| | | | | |
|---|---|---|---|---|
| 2021/0398697 | A1* | 12/2021 | LeBlanc | G21C 15/18 |
| 2022/0051817 | A1* | 2/2022 | Hejzlar | G21C 15/26 |
| 2022/0223302 | A1* | 7/2022 | De Groot | G21C 1/03 |

FOREIGN PATENT DOCUMENTS

| | | | |
|---|---|---|---|
| JP | 2013-76675 | A | 4/2013 |
| KR | 10-2015-0108999 | A | 10/2015 |

* cited by examiner

LIQUID METAL COOLED NUCLEAR REACTOR COMPRISING A PASSIVE DECAY HEAT REMOVAL SYSTEM HAVING THERMAL INSULATION ATTACHED TO A WALL OF A COLD SOURCE RESERVOIR THAT HOLDS A PHASE CHANGE MATERIAL, WHERE THE INSULATION IS ARRANGED TO AUTOMATICALLY FALL BY GRAVITY FROM THE WALL IN RESPONSE TO THE WALL REACHING A PREDETERMINED TEMPERATURE

TECHNICAL FIELD

The present invention concerns the field of fast neutron nuclear reactors cooled by liquid metal, in particular by liquid sodium, known as RNR-Na reactors or sodium fast reactors (SFR) and that form part of the so-called family of fourth generation reactors.

The invention more particularly addresses improvement of the function for evacuation of decay heat from these nuclear reactors.

The invention applies in particular to low or medium power reactors or SMR (small modular reactors), typically operating at a power between 100 and 500 MWth for a heat-generating reactor and between 50 and 200 Mwe for an electricity-generating reactor.

Remember that the decay heat (also known as “decay heat”) of a nuclear reactor is the heat produced by the core following shutting down of the nuclear chain reaction and consisting of the energy of disintegration of the fission products. In fact, in the event of a loss of electrical power supply the neutron chain reaction is interrupted by virtue of the control rods dropping into a reactor. However, some of the thermal power is still present, and is termed decay heat. Although decreasing, this power must imperatively be evacuated to prevent too high a rise in temperature in the core of the reactor.

Although described with reference to a nuclear reactor cooled by liquid sodium, the invention applies to any other liquid, such as liquid lead, used as the heat-exchange fluid in a nuclear reactor primary circuit.

PRIOR ART

In nuclear reactors the fundamental safety functions that must be assured at all times are confinement, control of reactivity, evacuation of heat and decay heat.

For the evacuation of decay heat there is a constant effort to improve the passivity and the diversification of the systems to guarantee improved overall reliability. The objective is to preserve the integrity of the structures, namely the first confinement barrier (fuel assembly sheath) and second confinement barrier (main containment vessel), even in the case of long-term generalised lack of electrical power (station blackout), which corresponds to a Fukushima type scenario, with total loss of the cooling means powered by electricity.

To be more specific, evacuation of the decay heat of a liquid metal reactor in a totally passive manner via the main containment vessel is currently envisaged. If this objective appears not to be achievable for a reactor of large size, because the power is too high, it may be realistically considered for low power (SMR) reactors in order to guarantee an intrinsic improvement of safety and of the systems for evacuation of the decay heat, hereinafter termed decay heat removal system systems, via the main containment vessel.

The decay heat removal systems currently used in sodium-cooled reactors are not totally passive, because they in fact employ control-command and/or human intervention. Moreover, these systems often use sodium circulation circuits with an in-air cold source that may suffer failures. Moreover, the current systems do not offer diversified solutions in relation to the heat pools providing the ultimate cooling of the reactor in the event of an accident, also known as the final cold source. They may be sensitive to internal, external aggression and malevolence.

Generally speaking the decay heat removal systems that have been produced or are known in the literature can be classified in three categories:

- A/ those located in the loops upstream of the energy conversion system;
- B/ those located at least in part inside the primary containment vessel of the reactor;
- C/ those located outside the primary or secondary containment vessel of the reactor.

A/ systems discharge the heat to air/liquid metal type exchangers: [1]. Their major disadvantages are that they necessitate the use of at least two exchangers, imply mainly active operation by forced convection with low performance in terms of natural convection, and require the use of an air/liquid metal type exchanger final cold source with risks of chemical interaction in the event of liquid metal leaks and external aggression to the final cold source.

B/ systems also discharge heat if evacuated to an air/liquid metal exchanger type final cold source.

Some B/ systems place either the cold collector or the hot collector inside the primary containment vessel: [1]. Apart from the aforementioned major disadvantages of A/ systems, they also involve the risk of contact with the radioactive liquid metal in the containment vessel and necessitate shutting down of the reactor in the case of handling of the components of these B/ systems.

Patent application JP2013076675A also discloses a B/ system that is described as a passive cooling system a part of which passes through the slab. The proposed solution has numerous disadvantages, including the seal required on passing through the slab, possible transfer of heat to the dome, the necessity to shut down the reactor in the case of handling the components of the system, and an additional weight to be supported by the slab.

C/ systems include exchangers, bundles of pipes and airflows outside the (safety) primary or secondary containment vessel.

In the context of the invention the safety containment vessel may be a metal container as such or a metal liner.

Known C/ systems located outside the secondary containment vessel have the following major disadvantages:

- necessarily active operation, that is to say using forced convection;
- limited efficacy because the internal fluid used (thermal oil) is not a good conductor of heat;
- chemical instability of the heat-exchange fluid at temperatures above 300-350° C.;
- poor cooling performance because effected mainly by radiation from the secondary containment vessel.

The aforementioned patent application JP2013076675A discloses a C/ system located outside the safety containment vessel: it includes a heat collector and descending and ascending flow of fluid by means of tubes in which the heat-exchange liquid circulates around the primary containment vessel, respectively formed between the heat collector and a silo and between the heat collector and a protection vessel, outside air being introduced into the descending flow passage to flow downwards and then upwards as far as the bottom of the silo to be finally evacuated to the outside. This system design has the disadvantages mentioned above, namely reduced efficacy because air is not a good conductor of heat and lower cooling performance because effected by the safety containment vessel. Moreover, there is a risk of external aggression to the final cold source, exposed to the outside.

The patent application KR20150108999 A discloses a C/ system located outside the secondary containment vessel. Here again the final cold source is exposed to the outside. Moreover, the solution disclosed suffers from numerous lacunae. Firstly, the components of the system must be welded to the secondary containment vessel. Moreover, the operation of the system assumes a phase transition of the heat-exchange fluid, which leads to a high variation of density, and therefore mechanical forces inside the pipe-work, and is ineffective in the phase preceding piercing of the containment vessel and meltdown of the core.

The application FR3104311A1 proposes a nuclear reactor cooled by liquid metal incorporating a decay heat removal system with a phase change material cold source that alleviates the drawbacks of the aforementioned A/, B/, C/ systems by not or only minimally modifying the nuclear reactors, including the buildings thereof.

There has been represented in FIGS. 1 to 4 an SFR type sodium-cooled nuclear reactor 1 according to the teaching of this application FR3104311A1 with a loop-type architecture and a system 2 for evacuation of at least the nominal power, when the reactor operates at 100% of its design power, and the decay heat of the reactor. This system 2 that functions during the normal operating phase of the reactor has two major advantages:

- no general starting up of the system required in the event of an accident;
- partial cooling of the containment vessel pool, as described in detail hereinafter.

This kind of SMR type reactor 1 includes a primary containment vessel 10 or reactor containment vessel filled with liquid sodium, termed the primary liquid, inside which are the core 11 in which are installed a plurality of fuel assemblies 110 that generate thermal energy by fission of the fuel and lateral neutron protection assemblies 11.

The containment vessel 10 supports the weight of the sodium in the primary circuit as well as internal components.

The core 11 is supported by two distinct structures enabling separation of the functions of support and of supply of cooling fluid to the core:

- a first pressure welded structure 12 termed a diagrid in which are positioned the feet of the fuel assemblies 110 and that is fed with cold sodium (at 400° C.) by primary pumps;
- a second welded structure 13 termed a strongback on which the diagrid comes to bear; the strongback generally bears on part of the internal wall in the bottom part of the primary containment vessel 10.

The diagrid 12 and the strongback 13 are typically made of AISI 316L stainless steel.

The sheaths of the assemblies 110 constitute the first confinement barrier while the containment vessel 10 constitutes the second confinement barrier.

As represented, the primary containment vessel 10 is of cylindrical shape with a central axis X extended by a hemispherical bottom. The primary containment vessel 10 is typically made of AISI 316L stainless steel with a very low boron content in order to prevent risks of cracking at high temperature. Its external surface is rendered highly emissive by pre-oxidation treatment, effected to facilitate the radiation of heat to the outside during the phase of evacuation of the decay heat.

A plug 14, termed the core cover plug, is located vertically in line with the core 10.

In this kind of reactor 1 heat produced during nuclear reactions inside the core 11 is extracted by causing the primary sodium to circulate by means of pumping means 150 located in the reactor containment vessel 10 to intermediate exchangers 15 located outside the containment vessel 10 in the example illustrated.

Thus the heat is extracted by the secondary sodium arriving cold via its feed pipe 152 at an intermediate exchanger 15 before it exits same hot via its outlet pipe 151. The extracted heat is then used to produce steam in steam generators that are not represented, the steam produced being fed into one or more turbines and alternators that are also not represented. The turbine(s) transform(s) the mechanical energy of the steam into electrical energy. Generally speaking, the heat extracted from the core by the sodium may be exchanged with a fluid by exchanger systems, the function of the fluid being to cause an electric turbine to turn and/or to produce heat for an application different from electricity generation.

The reactor containment vessel 10 is divided into two distinct zones by a separation device consisting of at least one containment vessel 16 located inside the reactor containment vessel 10. This device is also known as a step and is made of AISI 316L stainless steel. Generally speaking, as illustrated in FIG. 2, this device consists of a single interior containment vessel 16 the shape of which is cylindrical at least in its upper part.

The step 16 is generally welded to the diagrid 12 as shown in FIGS. 3 and 4.

As illustrated in FIG. 1 the primary sodium zone delimited internally by the internal containment vessel 16 collects the sodium leaving the core 11: it constitutes the zone in which the sodium is hottest and is therefore routinely termed the hot zone 160 or hot collector. The primary sodium zone 161 delimited between the internal containment vessel 16 and the reactor containment vessel 10 collects the primary sodium and feeds the pumping means: it constitutes the zone in which the sodium is the coldest and is therefore routinely referred to as the cold zone or cold collector 161.

As illustrated in FIG. 2, the reactor containment vessel 10 is anchored and closed by a closer slab 17 supporting the various components, such as the pumping means that are not represented, some components of the evacuation system 2, as explained hereinafter, and the core cover plug 18. The closer slab 17 is therefore an upper cover that encloses the liquid sodium inside the primary containment vessel 10. The slab 17 is typically made of non-alloyed (A42) steel.

The seal of the primary containment vessel 10 is guaranteed by a metal seal between the closer slab 17 and the core cover plug 18.

The core cover plug 18 is a rotating plug that carries all the handling systems and all the instrumentation necessary for surveillance of the core including the control rods the number of which depends on the type of core and its power, as well as the thermocouples and the other surveillance devices. The cover plug 18 is typically made of AISI 316L stainless steel.

The space between the closer slab 17 and the free levels of the sodium, commonly referred to as the cover gas plenum, is filled with a gas that is neutral relative to sodium, typically argon.

A support and confinement system 3 is located around the primary containment vessel 10 and below its closer slab 17.

To be more precise, as shown in FIGS. 3 and 4, this system 3 includes a containment vessel sink 30 in which are inserted, from the outside to the inside, a layer of thermally-insulating material 31, a liner type coating 32 and the primary containment vessel 10 of the reactor.

The containment vessel sink 30 is a block of parallelepipedal general exterior shape that supports the weight of the slab 17 and therefore of the components that it supports. The functions of the containment vessel sink 30 are to provide biological protection and protection against external aggression and also to cool the external environment to maintain low temperatures. The containment vessel sink 30 is typically a block of concrete.

The layer of thermally-insulating material 31 guarantees the thermal insulation of the containment vessel sink 30. The layer 31 is typically made of polyurethane foam or silicates.

The liner coating 32 guarantees retention of the primary sodium in the event of leaking from the primary containment vessel 10 and protection of the containment vessel sink 30. In other words, the liner 32, which guarantees retention of the primary sodium in the event of leakage from the primary containment vessel, is here similar to a safety containment vessel. The liner 32 bears against the containment vessel sink 30 and its upper part is welded to the closer slab 17. The liner 32 is typically made of AISI 316L stainless steel.

The space E between the liner coating 32 and the primary containment vessel, termed the inter-vessel space, is filled with a thermally-conductive gas such as nitrogen in order to cool the surface of the primary containment vessel 10 and also slightly to improve the transfer of heat to the decay heat removal system. It must therefore be sufficient to enable placement of the inspection systems used. The thickness of the inter-vessel space E varies between approximately 30 and 50 cm depending on the application. In the SFR application disclosed the thickness E is considered to be approximately 30 cm.

The evacuation of decay heat removal system 2 via the primary containment vessel 10 according to this application FR3104311A1 is described next.

The decay heat removal system 2 will enable completely passive evacuation of the decay heat to the outside of the primary containment vessel 10, capturing the thermal radiation emitted by the latter in the inter-vessel space E.

All of the system 2 according to this application FR3104311A1, and in particular the thermal storage therein, must be sized to conform to the two modes of operation:

- continuous conditions (normal operation or nominal power), so as to assure natural circulation of the heat-exchange fluid;
- decay heat removal conditions, evacuation of decay heat in an accident situation, i.e. with partial or total loss of the electrical power supply means (station blackout as envelope situation) so as to evacuate sufficient power from the core for the latter not to rise too much in temperature during a target time period, typically 7 days as envisaged at present.

The system 2 firstly includes a closed circuit filled with a liquid metal, which includes:

- a layer 40 of U-shape pipes 400, located in the inter-vessel space E, distributed around the primary containment vessel 10 and each extending along the primary containment vessel 10 with the bottom 4000 of the U-shapes facing the bottom 100 of the latter,
- a first collector 41, termed the cold collector, which is directly welded to each layer by each branch 401 of the U-shape, termed the cold branch, the cold collector being located outside and above the closer slab 17,
- a second collector 42, termed the hot collector, which is directly welded to each of the pipes of the layer by the other branch 402 of the U-shape, termed the hot branch, the hot collector being located outside and above the closer slab 17 and preferably in vertical alignment with the first, cold collector 41,
- a monotube exchanger 43 one end 431 of which is connected to the hot collector 42 and the other end 432 of which is connected to the cold collector 41.

The upper part of the closer slab 17 supports the weight of the parts that support the cold collector 41 and the hot collector 42.

The closer slab 17 includes openings of different types to enable the insertion of each pipe 400 of the layer. Accordingly, each tube 400 enters and leaves via the top of the slab 17.

In the case of a loop reactor as illustrated, some pipes 400 may circumvent the branches of the primary circuit if they exit/enter the sides of the primary containment vessel 10.

As shown in FIG. 4 the cold branches 401 of the U-shape pipes 400 are completely inserted inside the thermally-insulating layer 31 in order to limit its rise in temperature and to prevent phenomena of inversion of circulation of the fluid and in the final analysis to enable natural circulation of the liquid metal inside each pipe 400.

The layer of pipes has a diameter that is a function of the diameter of the primary containment vessel 10 and a height sufficient to have an area necessary for the required evacuation of heat.

In other words, the total number of and the size of the U-shape pipes 400 that constitute the layer 40 depend on the diameter of the primary containment vessel 10 and on the power of the core 11 of the nuclear reactor. For example, the pitch of the pipes of the layer may be equal to 10 cm, which is a good compromise for manufacture and absorption of heat by radiation.

For example, the outside diameter of each pipe 400 is set at a standard size of 5 cm in order to minimise head losses, reduce the bulk of the pipes in the inter-vessel space E and to maximise the area exposed to the primary containment vessel 10. The thickness of each pipe depends on the mechanical stresses exerted by the internal liquid metal and by its weight.

The material of each pipe 400 must have good emissivity characteristics on the hot branch 402 side that absorbs heat. The material of the pipes is typically chosen from AISI 316L stainless steel, ferritic steels, nickel, Inconel®, Hastelloy®. This material depends on the internal fluid used for the closed circuit.

This internal heat-exchange fluid C is a liquid metal, chemically stable, of low viscosity, a good conductor of heat offering good heat exchange, chemically compatible with all of the pipework of the circuit 4 and able to function by natural convection in a temperature range between 150-600° C. The liquid metal of the circuit may typically be chosen from an NaK alloy, a Pb—Bi alloy, sodium or one of the ternary alloys of the liquid metals, . . . .

As shown in FIG. 2 the cold collector 41 and the hot collector 42 have a toroidal general shape centred on the central axis (X) of the primary containment vessel 10. These collectors 41, 42 bear on support parts 44 welded directly to the closer slab 17.

The function of each monotube exchanger 43 is to evacuate the heat absorbed by the fluid inside the system 2 by cooling it at its outlet and enabling both evacuation of sufficient nominal power continuously to guarantee the natural convection movement of the heat-exchange fluid and evacuation of decay heat. As illustrated, each monotube exchanger 43 is preferably a straight tube. Each monotube exchanger 43 is typically made of AISI 316 stainless steel.

As illustrated in FIGS. 2 and 5 the decay heat removal system 2 according to the invention also includes a cold source configured to absorb the heat evacuated by radiation from the primary containment vessel 10 via the entirety of the layer 40 of pipes 400. The dimensions of the cold source depend both on the power of the core 11 of the reactor that determines the de facto decay heat to be evacuated and the envisaged transient duration, which therefore necessitates sufficient thermal inertia. The nominal operating point (nominal power) also influences the dimensions of the cold source.

The cold source includes at least one reservoir 50 of cylindrical shape at a distance from the primary containment vessel 10 and at a higher level than the closer slab 17. Each cylindrical reservoir 50 contains a phase change material of solid-liquid type in which the monotube exchanger 43 is inserted. Each reservoir 50 disperses by exchange by natural convection with the outside and by radiation from its walls to the outside some of the power evacuated during the accident phase and all of the heat evacuated by the system 2 during operation of the reactor at nominal power.

As illustrated, each reservoir 50 has a cylindrical general shape and is preferably placed on a concrete base to support its weight and that of the phase change material 51 and the monotube exchanger 43.

The external walls of each reservoir 50 are preferably of high emissivity to increase the heat emitted by radiation. Each reservoir 50 is typically made of Hastelloy®-N or of 316 stainless steel.

The dimensions of each reservoir 50 depend on the phase change material that it contains and the power to be evacuated in normal operation as well as in the decay heat removal system situation.

Each reservoir 50 is preferably confined in a confinement building 52. Thus the final cold source 5 of the system 2 according to the invention is protected against possible external aggression.

The internal walls of the confinement building 52 preferably have characteristics of high emissivity in order more easily to evacuate the heat radiated by the external walls of the reservoir 50 that is housed therein.

In order to place the cold source at the optimum distance from the primary containment vessel 10 the hydraulic circuit 2 includes a connecting loop 45, 45.1, 45.2 including a set of pipes and where applicable valves between the cold collector 41 and the hot collector 42 and each monotube exchanger 43.

To be more precise, as illustrated, each connecting loop 45, 45.1, 45.2 includes a hydraulic branch 451 that connects the cold collector 41 to the cold end 432 of the monotube exchanger 43 at the bottom of the reservoir 50 and a hydraulic branch 452 that connects the hot collector 42 to the hot end 431 of the monotube exchanger 43.

The cold collector 41 therefore distributes the flow of the liquid metal inside the cold branch 451 to each cold branch 401 of each tube 400 with a U-shape bottom and the hot collector 42 collects the internal liquid metal that comes from each hot branch 401 of each tube 400 with a U-shape bottom to feed the hot branch 452.

In other words, the system proposed in this application FR3104311A1 includes a supplementary intermediate circuit compared to existing installations. This supplementary circuit enables transfer of power from the core to the thermal storage reservoir external to the reactor, this thermal storage in turn evacuating the thermal power by thermal loss to the building in which it is located. The heat-exchange fluid that circulates by natural convection in this circuit is heated by the external wall of the primary containment vessel 10 by radiation toward the layers of pipes 400 placed around the containment vessel. Once heated the heat-exchange fluid is directed to the cold source of the decay heat removal system, where it is cooled, which enables it to descend again to the containment vessel 10. This natural circulation functions both under continuous conditions (normal operation of the reactor) and under decay heat removal conditions. The flowrate is higher under decay heat removal conditions because the power to be evacuated is higher than under continuous conditions.

The phase change material acts as a thermal buffer that is adapted, during the exchange with the liquid metal of the monotube exchanger 43, to be in the solid state in normal operation of the nuclear reactor (continuous conditions) and to go to the liquid state only in the situation of an accident affecting the nuclear reactor (decay heat removal system conditions) giving off the decay heat.

In other words, under continuous conditions its simply fulfils the role of a heat exchanger with the outside ("cold point") to maintain the flow of heat-exchange fluid by natural convection. The power exchanged must be minimal because it is lost for the cycle and nevertheless sufficient to maintain the heat-exchange fluid in movement by natural convection. The use for storage of a phase change material enables benefit of its latent heat when it is molten under decay heat removal system conditions. The phase change material contained in a reservoir 50 has the function of a thermal buffer, which is useful in order to limit the temperature rise of the heat-exchange fluid of the system. This effect is obtained because the temperature of the material during the change of phase is quasi-constant. In concrete terms, if the temperature of the heat-exchange fluid of the system rises less rapidly, more heat is exchanged between the containment vessel and the heat-exchange fluid by radiation. The cooling function under decay heat removal conditions is improved.

To improve the transfer of heat via the layer of tubes and to the cold source of the system the phase change material must have a high thermal conductivity.

For good operation in an accident situation the phase change material must have characteristics of high thermal inertia (high density and specific heat), high latent heat, a melting point between 250 and 400° C., a temperature of use between 150° C. (solid state) and 600° C. (liquid state).

The phase change material must also be chemically compatible with the internal fluid of the closed circuit 2 so that no problem arises in the event of interaction following a leak from the monotube exchanger 43.

The phase change material is typically chosen from cadmium when the heat-exchange fluid internal to the close circuit 2 is a NaK alloy or lead when the heat-exchange fluid is a Pb—Bi alloy.

This type of storage therefore makes it possible to achieve a higher energy density per unit volume than sensible heat type storage based only on increasing the temperature of the material. The system 2 remains entirely passive because the flow of fluid is produced by natural convection alone and external cooling is effected by radiation and by natural convection at the level of the external walls of the reservoir(s) 50 storing the phase change material.

The embodiment of storage of the phase change material in this application FR3104311A1 is shown in FIG. 5. The monotube exchanger 43 takes the form of a turn/a coil in which the heat-exchange fluid circulates and which extends the height of a reservoir 50.

The phase change material 51 consists of a powder or of a set of small spheres that improve the conduction of heat whilst facilitating placement thereof in the reservoir 50 in and around the monotube exchanger 43.

With a geometry of this kind, conforming to the aforementioned two operating modes necessitates:

- a distance between the turn 43 and the external wall 500 of the reservoir 50 that is sufficient to assure sufficient thermal resistance to limit thermal losses to the outside under continuous conditions; the thickness of phase change material between the turn 43 and the storage wall 500 is determined to achieve anyway a sufficient loss for the natural convection of the heat-exchange fluid to be maintained;
- a length and a diameter of the turn 43 sufficient for exchange of power between the heat-exchange fluid and the phase change material;
- a volume of phase change material sufficient to limit the temperature of the heat-exchange fluid and therefore of the core for the target duration, typically 7 days.

This example of phase change material storage is not completely satisfactory because conforming to the stated three constraints would lead to a very large storage volume.

Another possible configuration is shown in FIG. 6: it consists in replacing the turn 43 by multiple tubes 430 located in parallel and buried in the phase change material 51, all this being surrounded by a thermal-insulation layer 433 deposited on the external wall 500 of the reservoir 50. The tubes 430 make it possible to improve the power exchanged by increasing the area of exchange between the heat-exchange fluid and the phase change material and the volume of phase change material actually employed at any time, and the thermal-insulation layer 433 makes it possible to obtain the correct level of heat loss under continuous conditions, although the tubes 430 that are at the periphery are close to the wall 500. These modifications make it possible to conform to all the constraints under continuous conditions and under decay heat removal system conditions and to limit the size of the storage reservoir 50 by using all of the phase change material, including that close to the wall 500. This configuration moreover enables greater limitation of the head losses when the heat-exchange fluid goes into storage, which is favourable for the flow by natural convection of the heat-exchange fluid. In particular this enables limitation of the heat loss necessary to maintain the natural convection movement under continuous conditions.

On the other hand, under decay heat removal system conditions, this FIG. 6 configuration is not completely satisfactory. In fact, the insulating layer 433 becomes an impediment to evacuating power to the outside of the reservoir 50: it slows down the evacuation of power to the outside, which leads to an increase in temperature in the reservoir 50, and in the final analysis in the heat-exchange circuit and in the phase change material storage.

There is therefore a need to improve the decay heat removal system systems of nuclear reactors cooled by liquid metal, in particular to improve the solutions for evacuation of heat from the cold source to the outside, like that proposed in the patent application FR3104311A1 and that illustrated in FIG. 6.

The object of the invention is to address this need at least in part.

STATEMENT OF THE INVENTION

To this end one aspect of the invention concerns a fast neutron nuclear reactor cooled by liquid metal, including:

- a so-called primary containment vessel filled with a liquid metal as a heat-exchange fluid of the primary circuit of the reactor;
- a containment vessel sink located around the primary containment vessel and defining an inter-vessel space;
- a closer slab to enclose the liquid metal inside the primary containment vessel;
- a system for evacuation of both at least some of the nominal power and of the decay heat of the reactor in an accident situation, the system including:
  - a closed circuit filled with a heat-exchange liquid, including:
    - a layer of a plurality of U-shape pipes located in the inter-vessel space and distributed around the primary containment vessel and each extending along the primary containment vessel with the bottom of the U-shapes facing the bottom of the latter,
    - a first collector termed the cold collector to which each of the pipes of the layer is welded via one branch of the U-shape, termed the cold branch, the cold collector being located outside and above the closer slab,
    - a second collector termed the hot collector to which each of the pipes of the layer is welded by the other branch of the U-shape, termed the hot branch, the hot collector being located outside and above the closer slab,
      - an exchanger one end of which is connected to the cold collector and the other end of which is connected to the hot collector, the circuit being configured so that the heat-exchange liquid circulates therein by natural convection and remains in the liquid state in operation in an accident situation releasing the decay heat;

- a cold source including:
  - at least one reservoir located at a distance from the primary containment vessel and above the closer slab, the reservoir containing a phase change material of solid-liquid type in which the exchanger is inserted, the phase change material being adapted, during the exchange with the liquid metal of the exchanger, to be in the solid state in normal operation of the nuclear reactor and to go to the liquid state in an accident situation releasing the decay heat;
  - a thermally-insulating layer adapted to be fixed in a removable manner to at least part of the external wall of the reservoir, covering the latter, and to be passively detached therefrom if the temperature of said wall reaches a predetermined threshold value.

For operation under decay heat removal system conditions this predetermined temperature is higher than that reached under nominal conditions.

The thermally-insulating layer is advantageously configured to fall by gravity when it is detached from the external wall of the reservoir.

In accordance with one advantageous embodiment the insulating layer includes a plurality of contiguous thermally-insulating panels.

In accordance with another advantageous embodiment the reactor includes at least one passive device for removably fixing the thermally-insulating layer configured to fix the thermally-insulating layer up to the predetermined threshold temperature and to detach it passively above the threshold temperature.

In accordance with this embodiment the reactor preferably includes at least one passively removable fixing device per thermally-insulating panel.

In accordance with this embodiment and an advantageous variant embodiment, the reservoir is made of a magnetic material, the passively removable fixing device includes at least one permanent magnet fixed to each thermally-insulating panel, the magnet being magnetically attached to the external wall of the reservoir below the threshold temperature, the Curie temperature from which the magnet loses its magnetic properties being determined as a function of the threshold temperature.

The permanent magnet is preferably made of Fe—Ni alloy.

In accordance with another advantageous embodiment the external wall of the reservoir includes a plurality of fins covered by the thermally-insulating layer when the latter covers said wall.

At least one of the plurality of fins is advantageously inserted in each thermally-insulating panel.

In accordance with another advantageous embodiment the reactor further includes at least one active device for removably fixing the thermally-insulating layer configured to fix the thermally-insulating layer and to be activated on command by a user to detach the latter from the external wall of the reservoir whatever the temperature of the latter. In other words, detachment of the thermal-insulation layer can be actively triggered when an operator so decides.

In accordance with this embodiment the actively removable fixing device preferably includes at least one passively removable fixing device per thermally-insulating panel.

The cold source may include one or more reservoirs, in particular two distinct reservoirs.

One of the two exchangers of the two distinct reservoirs is preferably connected to an end of the collector that is opposite that to which the other of the exchangers is connected.

In accordance with an advantageous variant, the exchanger(s) are divided into multiple tubes arranged in parallel in each reservoir and surrounded by the phase change material. The phase change material may be in direct or indirect contact with the tubes. In the latter case the steel box wall may be in contact with the wall of a tube.

In accordance with an advantageous configuration the reactor includes a circulation loop including at least one hydraulic branch connecting the cold collector to the end of the monotube exchanger and at least one hydraulic branch connecting the cold collector to the end of the exchanger, and where appropriate one or more other fluidic components.

In accordance with another advantageous configuration the reactor includes at least one confinement building for confining each reservoir of the evacuation system.

The heat-exchange liquid of the decay heat removal circuit is preferably a liquid metal chosen from a binary lead-bismuth alloy, a binary sodium-potassium alloy, such as NaK, or other ternary alloys of the liquid metals.

The phase change material filling the reservoir(s) is preferably chosen from lead, cadmium, zinc or a zamak-type zinc alloy, tin and its alloys with lead or a ternary Li—Na—K carbonate mixture.

The reservoir(s) of the evacuation system is or are made of Hastelloy® or of ferritic stainless steel, based on nickel, including of Hastelloy® and Inconel®.

The invention therefore essentially consists in producing a nuclear reactor incorporating an integral system that guarantees:

- evacuation of decay heat in a completely passive manner from the initial moment of the accident;
- evacuation of power via the primary containment vessel;
- the presence of a final cold source with a reservoir incorporating an integral exchanger divided into a plurality of parallel tubes between which a phase change material is inserted, the reservoir being surrounded by a thermally-insulating layer that can be detached in a passive manner in the event of reaching a predetermined threshold temperature.

The thermally-insulating layer preferably consists of a plurality of thermally-insulating panels that advantageously surround all of the lateral envelope of the storage reservoir.

The passive detachment of the removable thermally-insulating layer may for example be assured by a permanent magnet fixed to the insulation and loses its magnetic properties at the Curie temperature determined as a function of the threshold temperature.

The removable thermally-insulating layer according to the invention makes it possible:

- to limit heat exchange to the outside under continuous conditions whilst positioning the exchanger tubes near the wall, which enables improved transfer of heat to storage and better use of all the phase change material;
- to modify the thermal resistance between the storage reservoir and the outside in a passive manner on going from the continuous conditions to the decay heat removal system conditions, which maintains the totally passive character of the system;
- in the variant with fins extending outward from the wall of the reservoir, to increase the power exchanged to the outside to a very high degree immediately upon unfastening/detaching the thermally-insulating layer by combining suppression of the thermal resistance linked to the thermal insulation between the wall of the reservoir and the outside with an increase in the area of exchange between the wall of the reservoir and the outside environment.

These advantages enable more effective evacuation of the heat from storage compared to the solution according to the application FR3104311A1: the temperature of the material contained in storage rises less rapidly and can therefore slow down the rise in temperature of the heat-exchange fluid. The efficacy of storage is therefore improved. In other words, using an insulating layer capable of being detached in a passive manner makes it possible to reduce the necessary size of the storage both in normal operation to enable natural convection of the heat-exchange fluid and in an accident situation to evacuate the decay heat while limiting the rise in temperature of the core and of the primary containment vessel of the reactor for a defined duration, typically 7 days.

Moreover, the decay heat removal system systems according to the invention has the same advantages as those according to the application FR3104311A1 through the manner of sufficiently evacuating power in a totally passive manner, from the outside of the primary containment vessel, benefitting from its radiation at high temperatures, of the order of 600° C., to the inter-vessel space and thanks to the detachment of the thermally-insulating layer from the storage facility of the decay heat removal system.

The system therefore has strong aspects of diversification and departure from other decay heat removal system systems known and used, which impart to it improve passive safety characteristics and absence of intervention delays, given the permanent circulation of the internal fluid. Accordingly, in the event of a generalised loss of voltage (MdTG), the decay heat removal system function is associated with no need for control-command, operator or cold source in contact with the outside of water or air type. This is referred to as intrinsic safety or a "walk-away safe" reactor.

The system according to the invention operates continuously, both in normal operation of the reactor at nominal power and in an accident situation.

Totally passive evacuation of the decay heat from the very start of the accident is guaranteed by the permanent natural circulation of the internal heat-exchange fluid that also takes place in normal operation. This continuous natural circulation is made possible thanks to the fluid density difference between the hot and cold branches of the U-shape pipes and their height.

The evacuation of heat via the primary containment vessel is advantageous because this function can also be guaranteed a priori in the event of a serious accident or seismic activity, which lead to serious deformations of the internal structures of the containment vessel. Under such extreme conditions systems inside the containment vessel, like those existing already, would not be able to accomplish this safety function correctly.

The diversification of the cold source and the passive operation of the decay heat removal system according to the invention reinforce the concept of safety of the installation vis-à-vis external aggression as well as failure of some other system.

Moreover, the use of a phase change material enables much more compact dimensions compared to a final cold source of air/liquid metal type.

If necessary, adding heat pumps may be envisaged to improve the flowrate of circulation of the heat-exchange liquid inside the closed circuit.

The invention applies to all nuclear reactors cooled by liquid sodium, whatever their configuration, characterising the mode of the primary circuit, of small or medium power or SMR (small modular reactor) type, typically an operating power between 100 and 500 MWth for a heat-generating reactor and between 50 and 200 MWe for an electricity-generating reactor, namely:

- integrated RNR for which the primary pumps and the exchangers are entirely contained inside the main containment vessel enclosing the core and are immersed in the cooling fluid of said main containment vessel through the closer slab of that containment vessel;
- partly integrated ("hybrid") RNR for which only the primary pumps are contained inside the main containment vessel enclosing the core;
- so-called "loop" RNR for which the primary pumps and the intermediate heat exchangers are placed in dedicated containment vessels outside the main containment vessel of the reactor which contains only the core and the internal structure, the main containment vessel and the component containment vessel being connected by primary pipes.

The heat-exchange liquid of the decay heat removal system circuit is preferable a liquid metal chosen from a binary lead-bismuth (Pb—Bi) alloy, a binary sodium-potassium (NaK) alloy, sodium or other ternary alloys of the liquid metals.

The phase change material filling the reservoir(s) is preferably chosen from lead, cadmium, zinc or a zamak-type alloy of zinc, tin and its alloys with lead, or a ternary Li—Na—K carbonate mixture.

The reservoir(s) of the evacuation system is/are preferably to be made of Hastelloy® or of ferritic stainless steel, based on nickel, including Hastelloy® and Inconel®.

The pipes and the hot and cold collectors of the circuit and where applicable the components of the loop are preferably made of a material chosen from AISI 316L or 304L stainless steel, ferritic steels, nickel-based alloys, Inconel®, Hastelloy®.

The preferred applications of the invention are small-size reactors (SMR) of the fourth-generation family GenIV, in particular reactors cooled by sodium and by lead.

Apart from the safety aspect, the invention may equally be employed for normal operation for greater flexibility in load monitoring.

Other advantages and features of the invention will emerge better on reading the detailed description of embodiments of the invention given by way of non-limiting illustration with reference to the following figures.

DETAILED DESCRIPTION

Throughout the present application the terms "vertical", "lower", "upper", bottom", "top", "below" and "above" are to be understood with reference to a primary containment vessel filled with liquid sodium and a thermal storage reservoir in a vertical operating configuration.

For the sake of clarity, the same references designating the same elements according to the prior art and according to the invention are used for all FIGS. 1 to 14B.

FIGS. 1 to 6 have already been commented on in the preamble and will therefore not be further commented on hereinafter.

Figure 1:
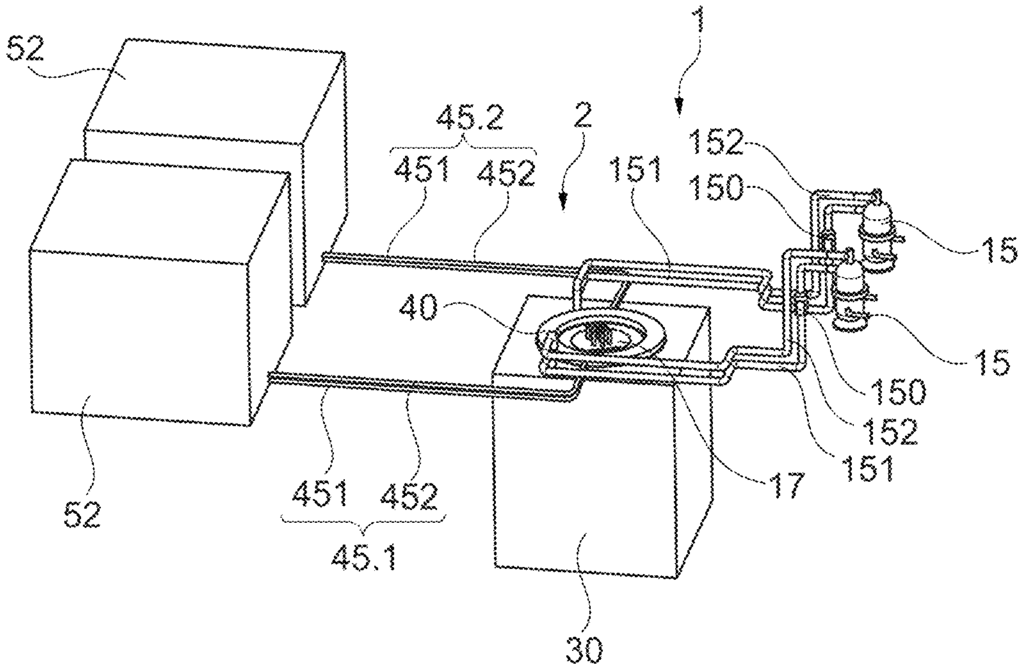
FIG. 1 is a diagrammatic view in perspective of a nuclear reactor (SFR) cooled by liquid sodium with a decay heat removal system according to the invention.
Figure 2:
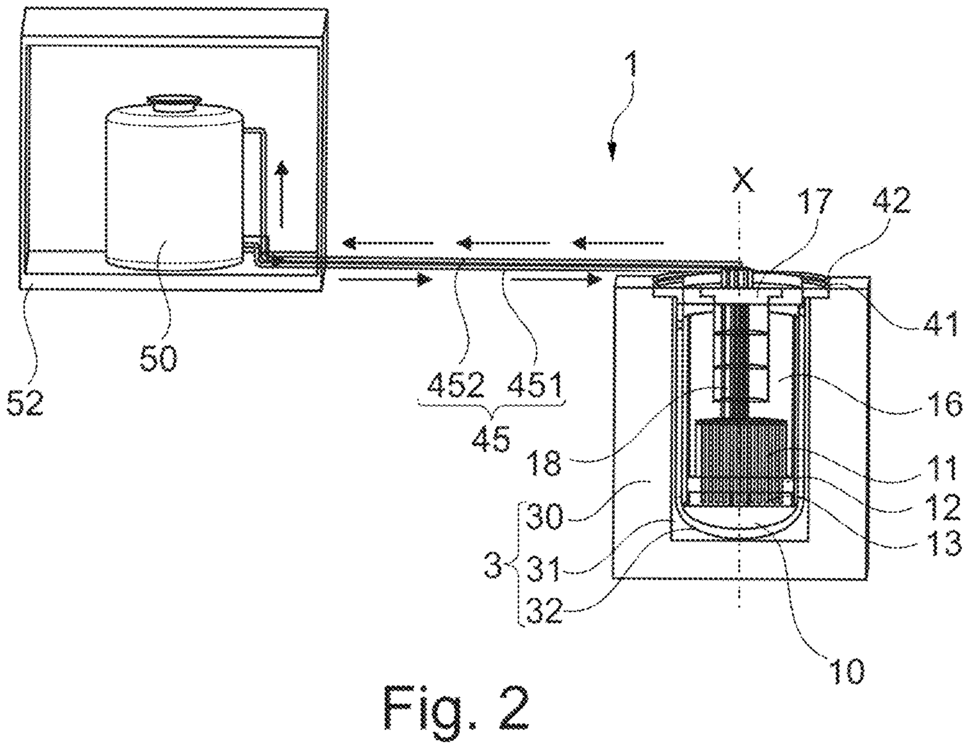
FIG. 2 is a view in partial section of part of FIG. 1.
Figure 3:
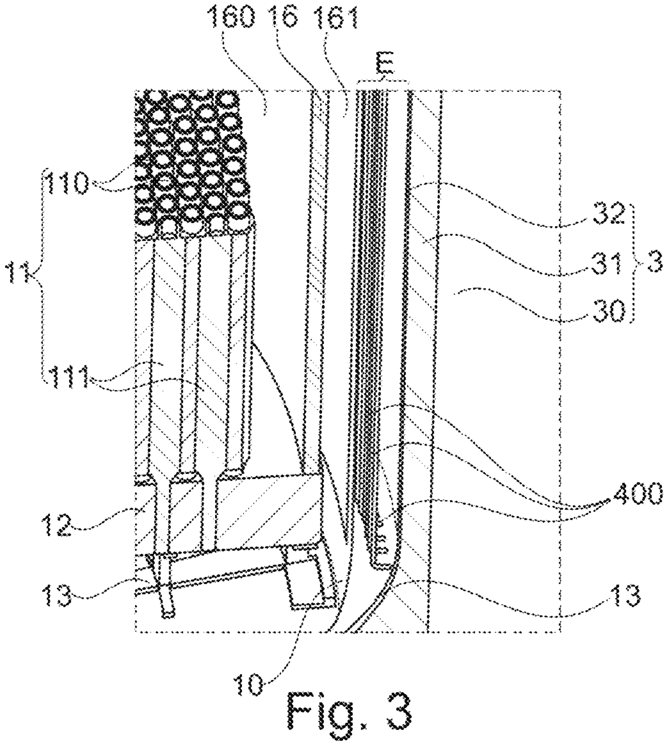
FIG. 3 is a view in partial longitudinal section showing the primary containment vessel and part of the fuel assemblies of an SFR type nuclear reactor and part of the layer of pipes of a decay heat removal system according to the invention.
Figure 4:
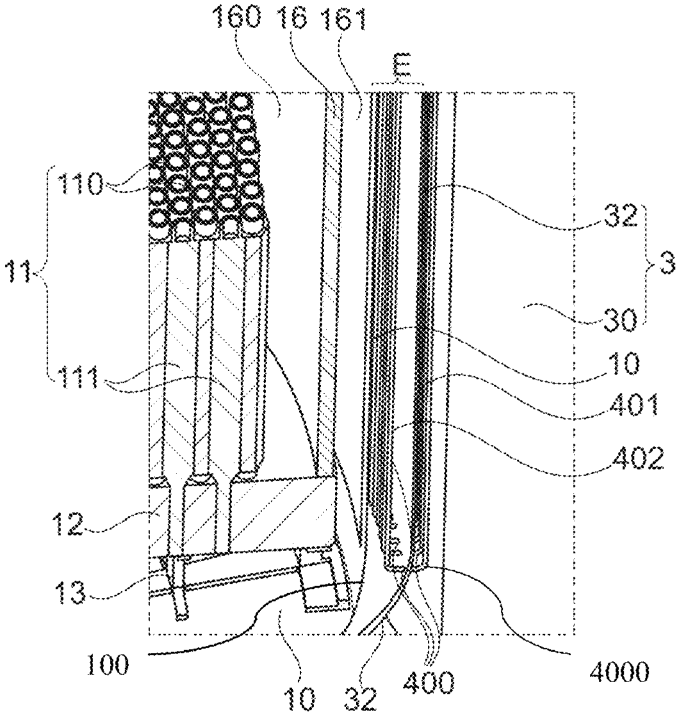
FIG. 4 repeats FIG. 3 but without the presence of a layer of thermally-insulating material.
Figure 5:
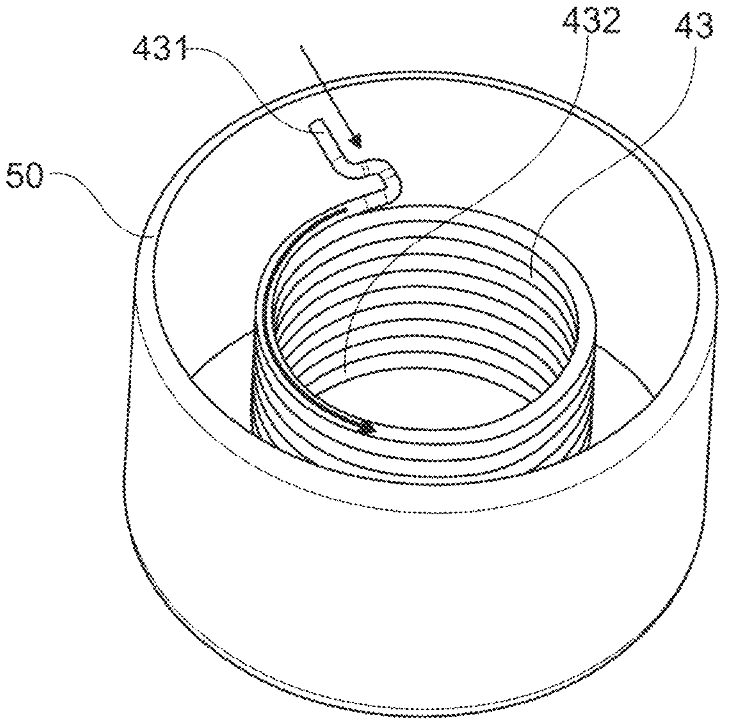
FIG. 5 is a diagrammatic view in perspective of the interior of a thermal storage reservoir containing a phase change material and a monotube exchanger of the closed circuit of a decay heat removal system according to the patent application FR3104311A1.

Nor is there described the sodium-cooled (SFR type) nuclear reactor 1 with a loop type architecture, with a system 2 for evacuation of at least some of the nominal power and of the decay heat from the reactor represented in FIGS. 1 to 4, to which the cold source according to the invention is applied instead and in place of that according to the prior art from FIG. 5.

Figure 6:
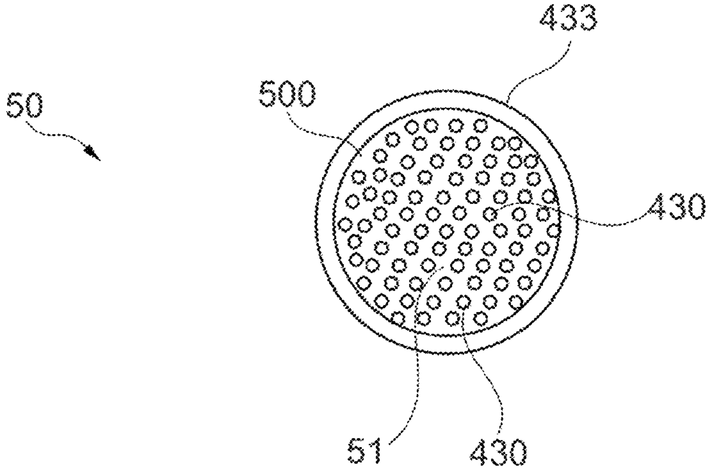
Fig. 6 (PRIOR ART)
FIG. 6 is a view in section illustrating one possible embodiment of a prior art thermal storage reservoir containing a phase change material and an exchanger divided into a plurality of tubes.

The cold source includes at least one thermal storage reservoir 50 accommodating multiple tubes 430 located in parallel and embedded in the phase change material 51, as in FIG. 6.

According to the invention, a thermally-insulating layer 6 is located to be removably fixed to the lateral envelope of the external wall 500 of the reservoir, covering the latter and being detached therefrom in a passive manner if the temperature of said wall reaches a predetermined threshold value.

Figure 7A:
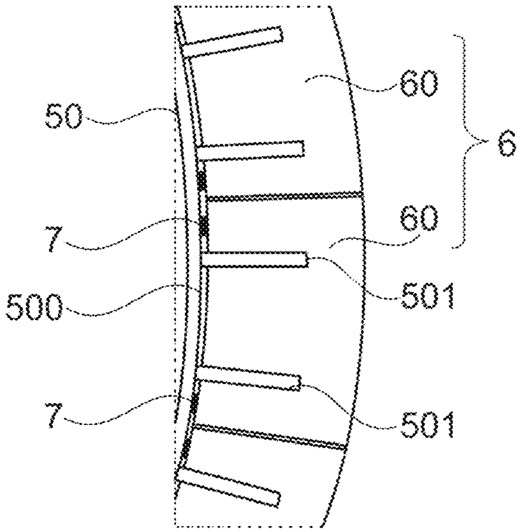
FIGS. 7A, 7B are partial views in cross-section at the level of a finned external wall of a thermal storage reservoir with the thermal-insulating panels covering said wall in accordance with the invention, respectively before and after their passive detachment from the wall.
Figure 7B:
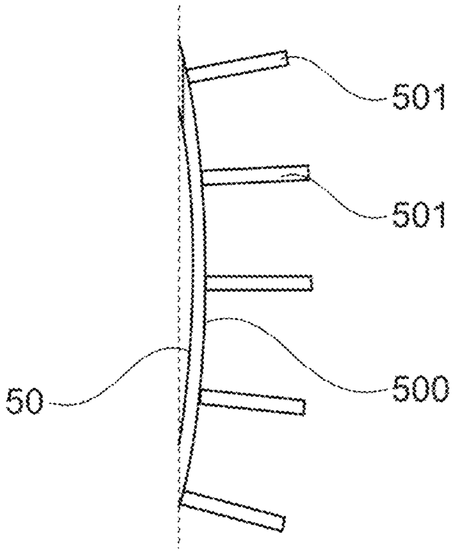

As shown in FIGS. 7A and 7B the layer 6 consists of a plurality of contiguous thermally-insulating panels 60. These may be panels based on glass wool or rock wool.

For the removable fixing of the isolating panels 60 at least one passive device 7 is configured to fix the thermally-insulating layer up to the predetermined threshold temperature and to detach it in passive manner above the threshold temperature.

The passive device 7 preferably consists of a permanent magnet fixed to each thermally-insulating panel 60. In this case the reservoir 50 is made of a magnetic material.

Figure 8:
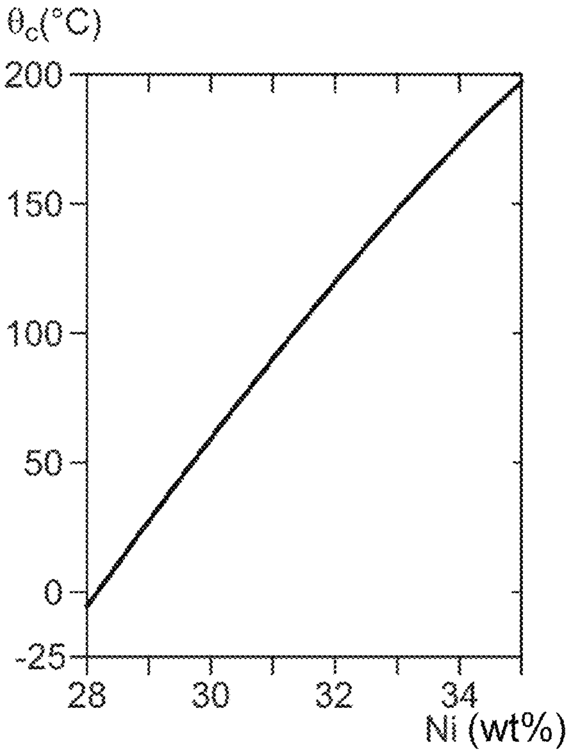
FIG. 8 illustrates in the form of a curve the Curie temperature for Fe—Ni alloys as a function of the proportion of nickel.

For example, Fe—Ni type alloys having a Curie temperature, the temperature above which the alloy loses its magnetic properties, that depends on the proportions of the constituents, as shown in FIG. 8. The proportion of constituents can therefore be chosen to define the Curie temperature as a function of the threshold temperature from which a magnet 7 will no longer be functional and from which the panels 60 will therefore be detached from the external wall 500 of the reservoir 50.

To increase the area of exchange with the outside air, necessary only when the thermal-insulating panels 60 are detached from the wall 500 of the reservoir 50, fins 501, which are straight in the example illustrated, are produced on the wall 500. The fins 501 extend radially with respect to the cylindrical reservoir 50 and are covered by each thermally-insulating panel 60 in its fixed configuration and therefore have no effective role in thermal exchanges with the outside when the insulating panels are in place. In the example illustrated two fins 501 are inserted in a panel 60. The fins 501 may be fixed to the reservoir 50 or form an integral part thereof.

The magnet 7 is therefore magnetically attached to the external wall 500 (FIG. 7A) when the temperature of the external wall 500 of the reservoir 50 is below the threshold temperature.

As soon as the external wall temperature 500 is above the threshold temperature the fixing of the thermally-insulating panels 60 is no longer effective because of the loss of the magnetic properties of the magnet 7, as explained hereinafter. The panels 60 are therefore detached from the wall 500 and drop through gravity. The external wall 500 is therefore bare and via its fins 501 exchanges heat directly with the surrounding air (FIG. 7B).

Figure 9A:
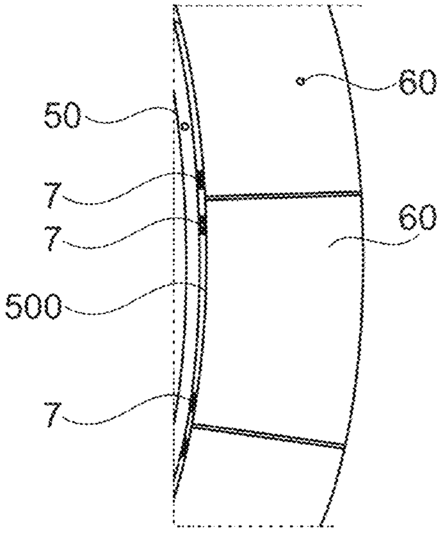
FIGS. 9A, 9B are partial views in cross-section at the level of an external wall of a thermal storage reservoir with the thermally-insulating panels covering said wall in accordance with a first variant of the invention in which the wall is without fins, respectively before and after their passive detachment from the wall.
Figure 9B:
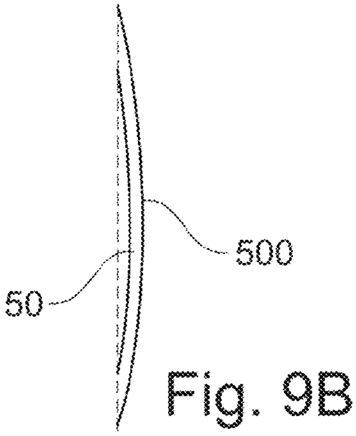
Figure 10:
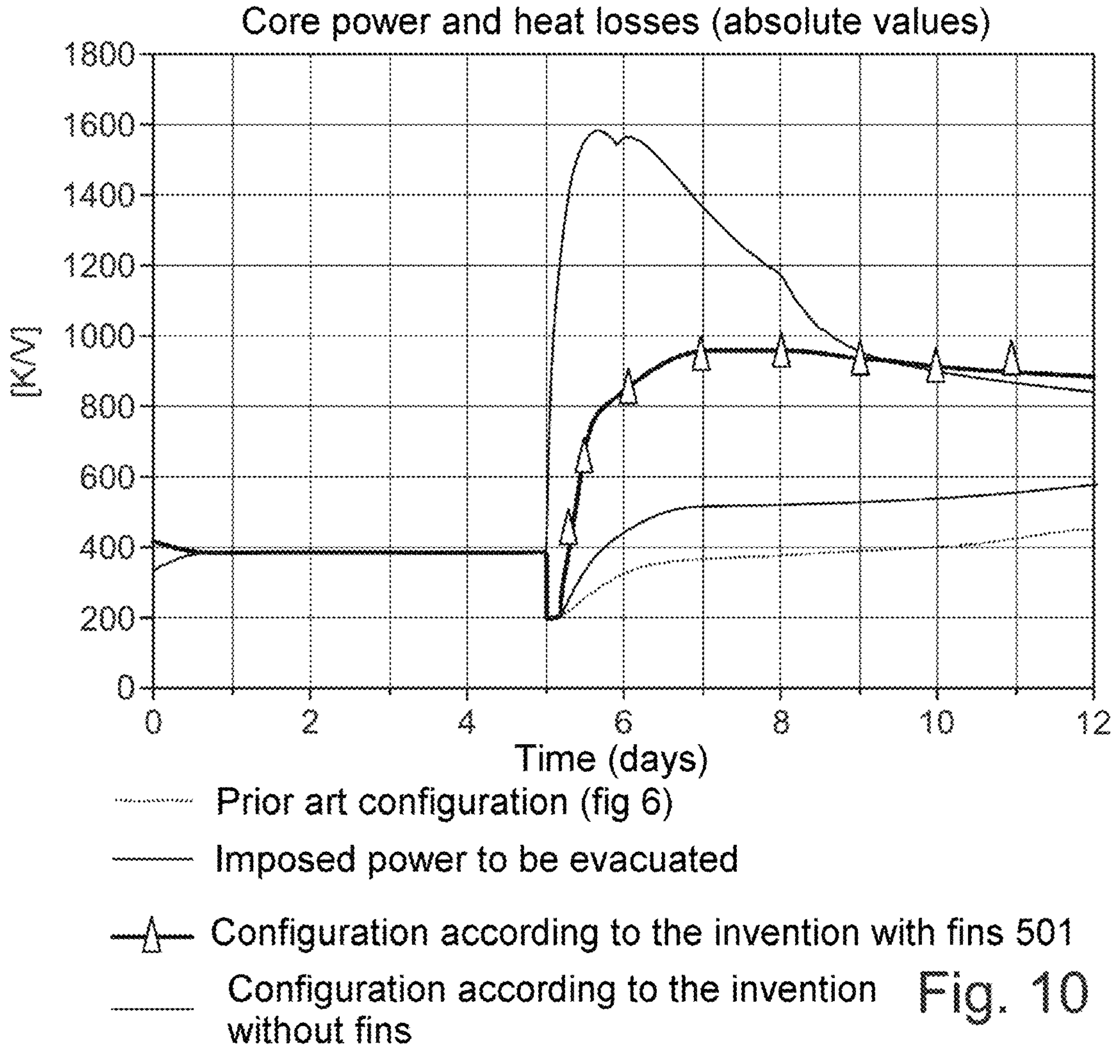
FIG. 10 illustrates in the form of respective curves an example of thermal power to be evacuated imposed in a nuclear reactor, the thermal losses to the outside of the thermal storage reservoir incorporating an integral exchanger divided into multitubes with passive detachment at 240° C. of the thermally-insulating panels with a reservoir external wall with fins, without fins and for comparison a prior art configuration with a permanent thermally-insulating layer (FIG. 6).
Figure 11:
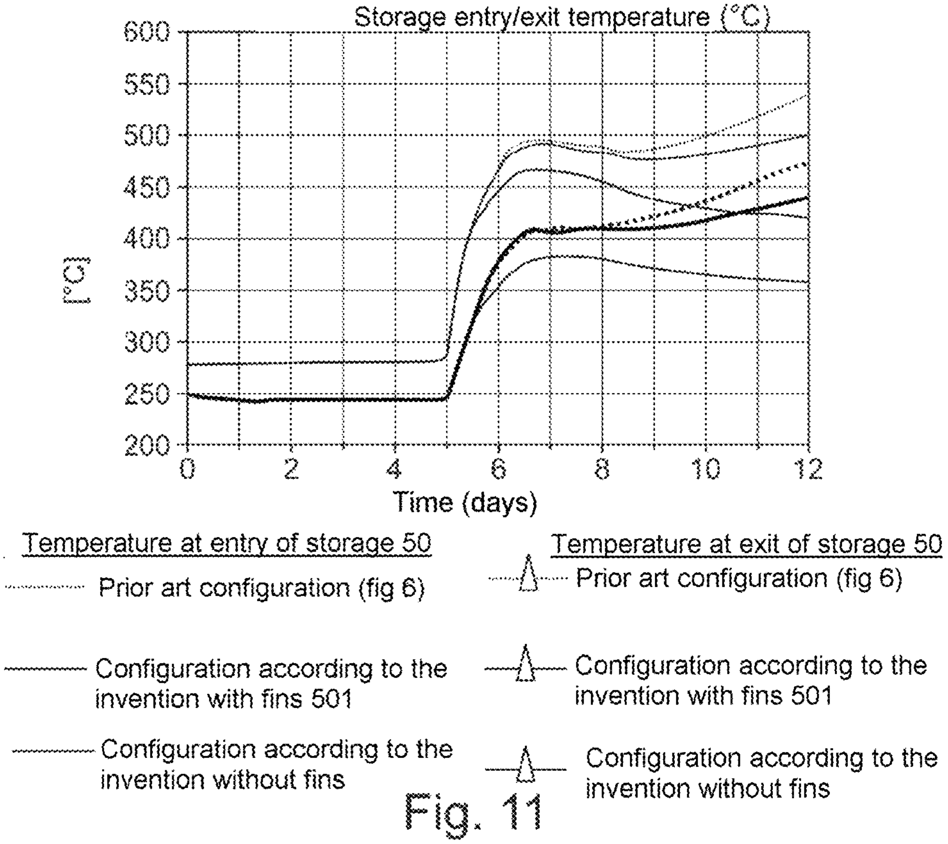
FIG. 11 illustrates in the form of respective curves an example of temperatures of the heat-exchange fluid at the entry and at the exit the thermal storage reservoir incorporating an exchanger divided into multitubes with passive detachment at 240° C. of the thermally-insulating panels with a reservoir external wall with fins, without fins and for comparison a configuration with a prior art permanent thermally-insulating layer (FIG. 6).
Figure 12:
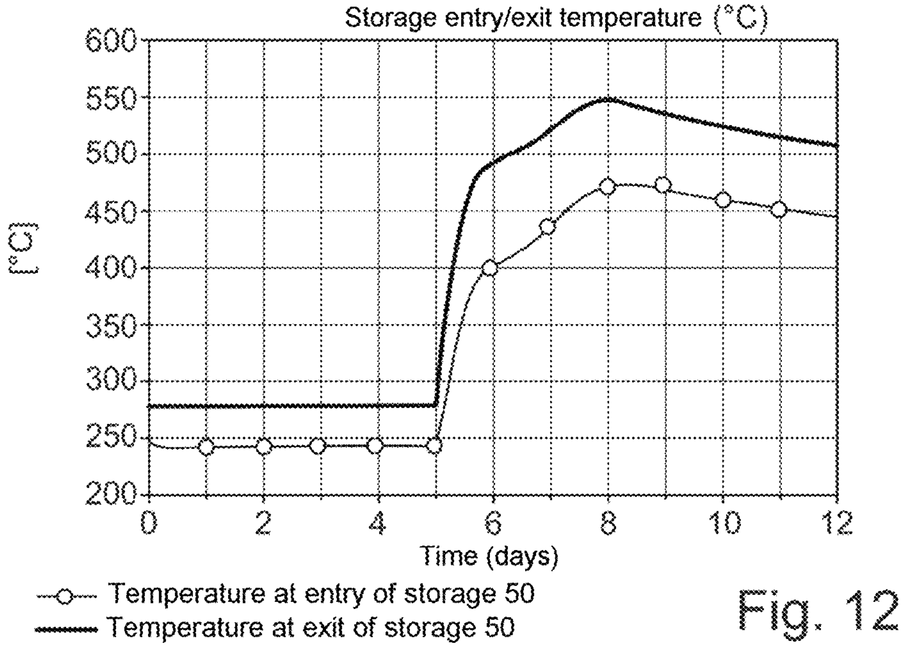
FIG. 12 illustrates in the form of respective curves an example of temperatures of the heat-exchange fluid at the entry and at the exit of the thermal storage reservoir incorporating an integral multitube exchanger with passive detachment at 240° C. of the thermally-insulating panels with a reservoir external wall with fins.

A variant may consist in there being no fins on the external wall. This variant is illustrated in FIGS. 9A and 9B respectively showing the fixed configuration of the insulating panels 60 and the latter once detached from the external wall 500. This variant can facilitate the production of the external wall 500 and that of the insulating layer 6 and fixing thereof to the wall 500. However, the absence of fins limits the efficacy of thermal-exchange with the outside, as corroborated by the simulations described hereinafter the results of which are shown in FIGS. 10 and 11.

To illustrate the benefit of the removable thermally-insulating panel solution according to the invention, the inventors have carried out numerical simulations with by way of hypotheses a threshold temperature for detachment of the panels equal to 240° C. and multiplication by a factor of 3 of the area of exchange with the air surrounding the wall 500 via the fins 501.

In these simulations the material assuring the magnet role may be an Fe—Ni alloy having a Curie temperature higher than the threshold temperature for detachment of the thermally-insulating panels. The difference between the Curie temperature of a permanent magnet 7 and the threshold temperature may typically be of the order of 50° C. This temperature difference is explained by the fact that the reduction of magnetisation commences before reaching the Curie temperature, to zero at the Curie temperature. An insulating panel 60 will therefore be detached from the external wall 500 by virtue of its own weight before the Curie temperature is actually reached at the level of the external wall, whence the difference, typically of the order of 50° C.

In the simulations the exchanger 43 is treated as a plurality of parallel vertical tubes 430 that offers better performance for exchanging the thermal power of the heat-exchange fluid with the storage phase change material, as schematically represented in FIG. 6.

Account is also taken of a power profile to be evacuated imposed at the level of the heat-exchange fluid and of an objective of maintaining the temperature of the heat-exchange fluid below 550° C. for a period of 7 days. This imposed power profile comprises two phases, namely a first phase of 5 days under continuous conditions and a second phase with a peak of power to be evacuated that commences at the start of the 6$^{th}$ day and takes a characteristic form with rapid growth for 12 h followed by a slow decrease (curve in solid line in FIG. 10).

Three thermal storage configurations are compared:

prior art reference storage using multitubes 430 sized to conform to the constraints on the temperature rise of the heat-exchange fluid (550° C.) for 7 days;

storage with the same dimensions as the reference storage, with thermally-insulating panels that are detached from the wall 500 in a completely passive manner at a threshold temperature of 240° C. by virtue of the demagnetisation of the permanent magnets 7 and of the fins 501 being sized to increase by a factor of 3 the area of exchange with the surrounding air;

with the same dimensions as the reference configuration, with thermally-insulating panels that are detached from the wall 500 with no fins in a completely passive manner at a threshold temperature of 240° C. by virtue of the demagnetisation of the permanent magnets 7.

It emerges from the simulations that the thermal exchanges of the storage with the outside are increased with the insulating panels 60 that are detached in a passive manner and even further increased when the storage reservoir 50 has fins 501 at the periphery of its wall 500, as shown in FIG. 10 and described hereinafter.

This increased evacuation of heat to the outside of the reservoir 50 enables limitation of its rise in temperature: this therefore makes it possible to maintain the temperature of the heat-exchange fluid below the limit temperature for longer, as illustrated in FIG. 11.

In the reference configuration, i.e. with insulating panels 60 that are not detachable, the temperature of the heat-exchange fluid reaches the limit value of 550° C. after 7 days from the commencement of the total loss of electricity because the dimensions of the reservoir 50, of the tubes 430 and of the phase change material 51 have been defined to enable this constraint to be complied with.

Using the thermally-insulating panels 60 according to the invention, the heat-exchange fluid remains at all times below 470° C. with, moreover, a temperature that is decreasing 2.5 days after the start of the peak (FIG. 11). The invention therefore enables storage to be considerably more efficacious for evacuation of the power of the heat-exchange fluid.

This improved storage performance using the panels 60 according to the invention enables reduction of the dimensions of the storage reservoir 50 and of the material 51 necessary to comply with the temperature limit of 550° C. for 7 days.

Table 1 below summarises the various dimensions for the three configurations stated.

TABLE 1

| | Configuration | | |
|---|---|---|---|
| Dimensions | Reference storage | Storage with panels 60 without fins 501 | Storage with panels 60 with fins 501 |
| Diameter of cylindrical reservoir 50 (m) | 11.7 | 10.6 | 7.2 |
| Height of cylindrical reservoir 50 (m) | | 2 · 77 | |
| Volume of phase change material per reservoir 50 ($m^3$) | 298 | 242 | 113 |

It emerges from this table 1 that, compared to the reference configuration:

the reduction is 10% in terms of the diameter of the reservoir 50 and 19% in terms of the volume of phase change material with the configuration of panels 60 without fins in accordance with the invention;

the reduction is 38% in terms of the diameter of the reservoir 50 and 62% in terms of the volume of phase change material with the configuration of panels 60 with fins 501 in accordance with the invention;

With dimensions reduced thanks to the invention, the maximum temperature of 550° C. is reached after 3 days and the temperature then decreases (FIG. 11). This means that using the invention it is possible to continue to comply with the temperature constraint beyond the target 7 days (FIG. 10), which is not the case for the reference storage configuration, i.e. without detachable panels 60.

Figure 13A:
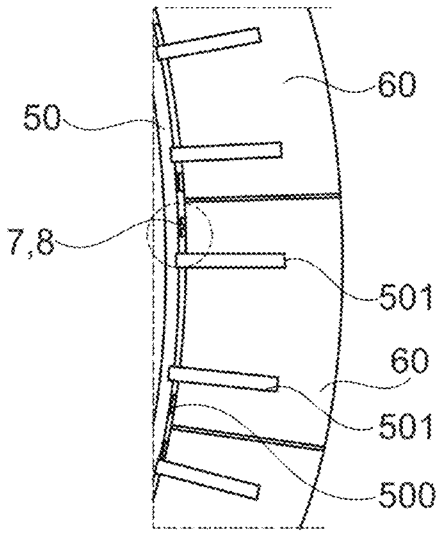
FIGS. 13A, 13B, 13C are partial views in cross-section and detail views at the level of an external wall of a thermal storage reservoir with the thermally-insulating panels covering said wall in accordance with a second variant of the invention including active devices for detaching the panels, respectively before and after their passive detachment from the wall.
Figure 13B:
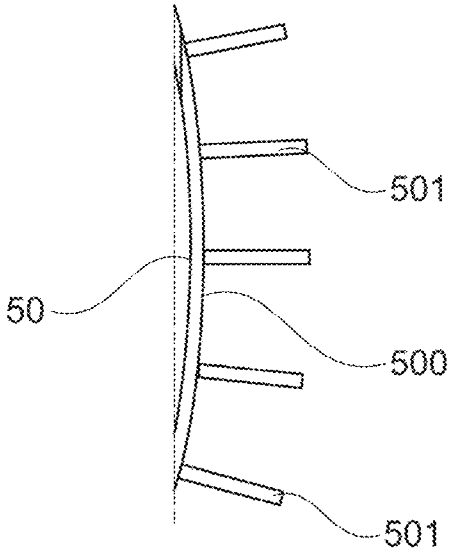
Figure 13C:
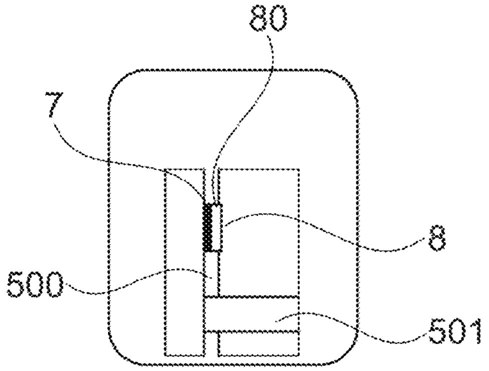

FIGS. 13A to 13C show another possible variant embodiment.

In accordance with this variant there is added to each passive device 7 for removably fixing the thermally-insulating panels 60 an active device 8 that enables each insulating panel 60 to be detached on command by a user.

Several types of active devices 8 may be envisaged.

First of all, an electromagnetic sucker may be used. An electromagnetic sucker comprises a sucker as such and a magnetic backing plate. For example, here there may be provision for fixing the sucker to a removable panel 60 and the backing plate to a support, which is itself fixed to the wall 500 of the reservoir by a permanent magnet by way of a passive device, which loses its magnetic capacity beyond the threshold temperature. If the electrical power supply is interrupted the two parts of the sucker separate and the panel is therefore released.

Another active device 8 may consist in a device actuated by an electrical pulse, for example producing a magnet effect that moves a strike that would retain the panel in place in normal operation of the reactor. Relative to an electromagnetic sucker device 8, an electrical pulse actuating device can make it possible not to be dependent on the smallest possible interruption of current, even of minimum duration, that could lead to unwanted detachment of all the panels when the situation of the reactor core does not necessarily require it.

Another active device 8 may consist in a retaining structure movable by a motor, movement thereof causing detachment of the thermally-insulating panels and therefore causing them to fall by gravity.

Another active device 8 solution that may be envisaged consists in arranging the permanent magnet 7 only at the edge of each thermally-insulating panel 60, which is placed on rails fixed to the reservoir 50, and an active element 8 descends the rails by gravity and tips over the permanent magnets 7.

More generally, other active devices 8 may be envisaged, for example a device with human intervention, such as a rolling structure to be moved to which the thermally-insulating panels would be fixed.

Any such active device 7 may be controlled for example via a control wire 80.

With an active device 8 an operative can detach the panels 60 even before the passive detachment threshold temperature criterion is reached. For example, in the event of going to the decay heat removal mode noted at the level of the core of the reactor, an operator may wish to detach the panels 60 as a preventive measure even before the external wall 500 reaches the threshold temperature. This makes it possible to save time for the effect of thermal exchanges with the surrounding air and therefore to limit the rise in temperature. If the operator does not make use of this possibility of detachment by the active device, passive detachment nevertheless occurs automatically when the threshold temperature criterion is reached.

In the configuration with fins 501, as a function of the design of the latter and of the thermally-insulating panels 60, at least some of the fins could be retained on at least one of the thermal-insulating panels 60 whereas the latter has just been detached either in passive manner or in active manner. This fin (these fins) could be retained up to the point of blocking the falling of the panel(s).

Figure 14A:
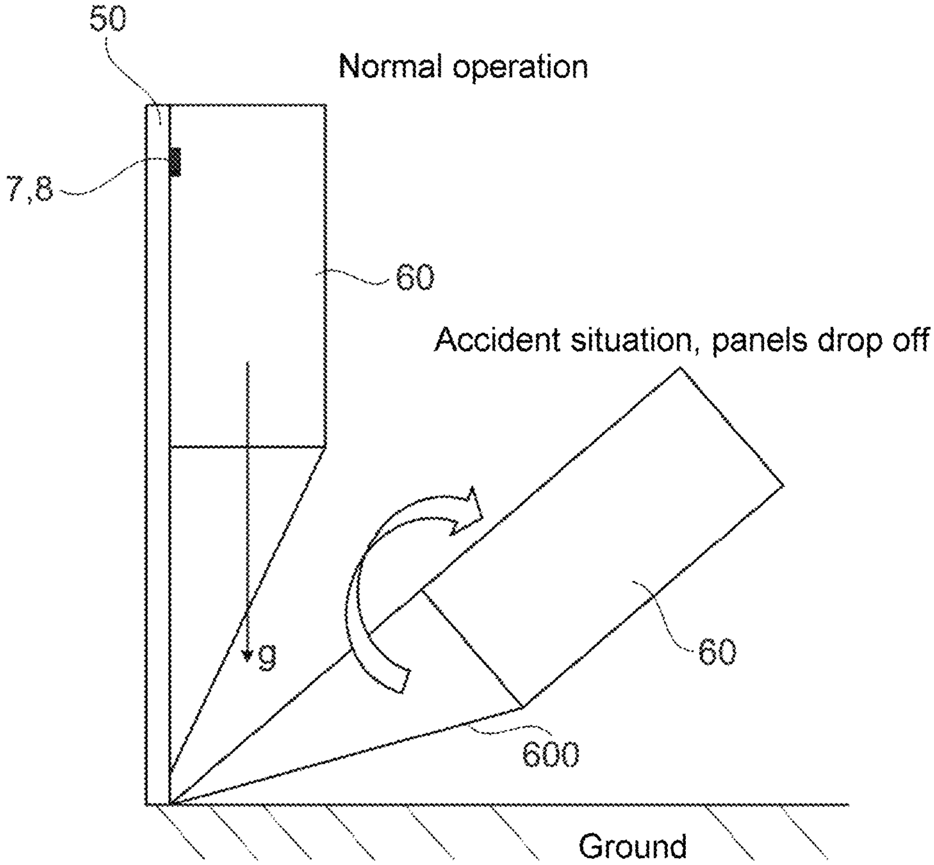
FIGS. 14A, 14B are partial views in cross-section at the level of an external wall of a thermal storage reservoir with the thermally-insulating panels covering said wall according to a variant of the invention in which the panels have a shape adapted to falling thereof by gravity when the reservoir is provided with fins.

To eliminate this risk the inventors have conceived a geometric configuration that, despite the presence of the fins, causes the thermally-insulating panel or panels to fall by gravity whatever happens when passive or active triggering, for example demagnetisation of the permanent magnet, occurs. A panel geometric configuration must enable movement in rotation of the latter enabling it to tilt from the bottom. An example of this configuration before and during detachment is shown in FIG. 14A: the thermally-insulating panels 60 has a tapered shape 600 in its lower part which enables it to tilt from the top when it is detached from the wall 500 of the reservoir 50.

Figure 14B:
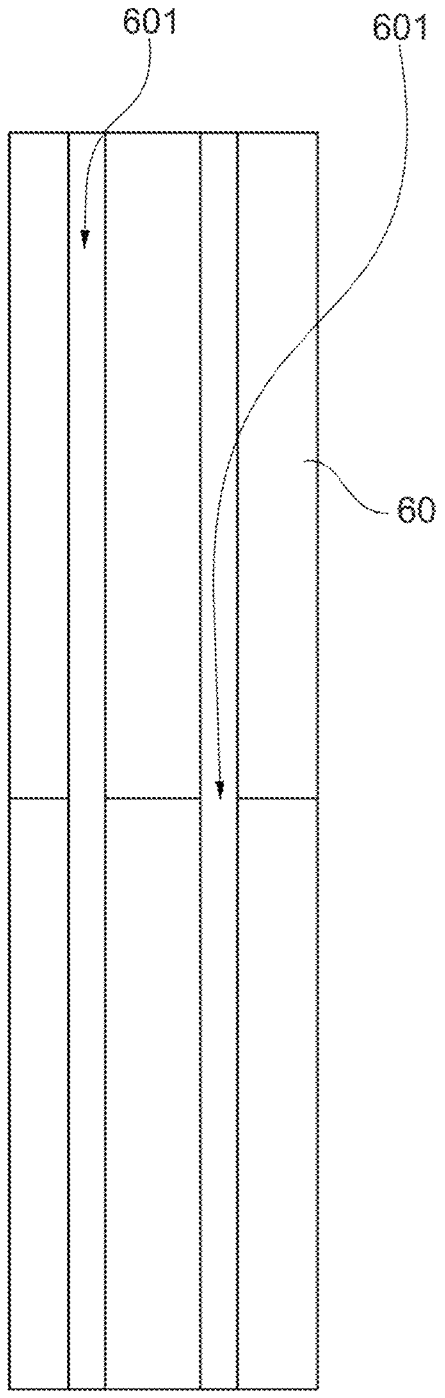

FIG. 14B shows grooves 601 produced in the panel 60 in each of which a fin 500 can be inserted to be covered by said panel 60.

The invention is not limited to the examples that have just been described; the features of the examples illustrated found in variants that are not illustrated may in particular be combined with one another.

Other variants and embodiments may be envisaged without departing from the scope of the invention.

The decay heat removal system that has just been described with reference to a loop-type nuclear reactor may be employed in a nuclear reactor of integrated type for generating electricity or heat.

In one integrated reactor design the layer 40 of pipes surrounds all of the primary containment vessel 10 in a homogeneous manner.

In some loop-type reactors the pipes 400 that are located alongside the primary circuit are able to join in a micro-collector at the level of the branch in order to prevent possible hot spots for the U-shape pipes 400 involved.

In the examples illustrated the fins 501 are straight and extend radially with respect to the cylindrical storage reservoir 50. There may be any other type of fins, in particular corrugated plates, metal braids.

The invention may also entirely be employed in a nuclear reactor of heat-generating type.

REFERENCE CITED

[1]: HOURCADE E. et al., "*ASTRID Nuclear Island design: update in French-Japanese joint team development of decay heat removal system*", 2018, ICAPP.

The invention claimed is:

1. A fast neutron nuclear reactor cooled by liquid metal, comprising:

a primary containment vessel filled with a liquid metal as a heat-exchange fluid of the primary circuit of the reactor;

a containment vessel sink located around the primary containment vessel and defining an inter-vessel space between the primary containment vessel and the containment vessel sink;

a closer slab to enclose the liquid metal inside the primary containment vessel;

a system for evacuation of both at least some heat of the reactor during normal operation, and decay heat of the reactor during an accident situation, the system including:

a closed circuit filled with a heat-exchange liquid, the closed circuit including:

a layer of a plurality of U-shape pipes located in the inter-vessel space and distributed around the primary containment vessel, each of the pipes extending along the primary containment vessel with a bottom of the U-shapes adjacent to a bottom of the primary containment vessel, the closed circuit being configured so that the heat-exchange liquid circulates therein by natural convection, and remains in the liquid state both during normal operation of the reactor, and during an accident situation releasing decay heat;

a cold collector, the cold collector being connected to a cold branch of the U of each of the pipes, and the cold collector being arranged outside and above the closer slab, a hot collector, the hot collector being connected to a hot branch of the U of each of the pipes, and the hot collector being arranged outside and above the closer slab, at least one heat exchanger having one end connected to the cold collector and the other end connected to the hot collector, a cold source including:

at least one reservoir located at a distance from the primary containment vessel and above the closer slab, the reservoir comprising an external wall, the reservoir containing the heat exchanger therein, the reservoir containing a phase change material capable of being in a solid state and in a liquid state, the phase change material being configured, during the exchange with the heat exchanger, to be in the solid state during normal operation of the nuclear reactor and to transition to the liquid state during an accident situation of the reactor in which decay heat is released;

a thermal insulating layer;

the thermal insulating layer being attached to the external wall of the reservoir via at least one attachment element, and the at least one attachment element being configured to cause the thermal insulating layer to be automatically detached from the wall in response to the wall reaching a predetermined temperature, which allows the thermal insulating layer to fall by gravity from the external wall of the reservoir.

2. The fast neutron nuclear reactor according to claim 1, the thermal insulating layer comprising a plurality of contiguous thermal insulating panels.

3. The fast neutron nuclear reactor according to claim 2, comprising at least one attachment element for each of the thermal insulating panels.

4. The fast neutron nuclear reactor according to claim 3, the external wall of the reservoir being made of a magnetic material, the at least one attachment element comprising at least one permanent magnet fixed to each thermal insulating panel, the at least one permanent magnet being magnetically attached to the external wall of the reservoir below a threshold temperature, the Curie temperature from which the magnet loses its magnetic properties being determined as a function of the predetermined temperature.

5. The fast neutron nuclear reactor according to claim 4, the at least one permanent magnet being made of Fe—Ni alloy.

6. The fast neutron nuclear reactor according to claim 1, the external wall of the reservoir comprising a plurality of fins covered by the thermal insulating layer when the thermal insulating layer is attached to the external wall of the reservoir.

7. The fast neutron nuclear reactor according to claim 6, at least one of the plurality of fins being inserted in each of the thermal insulating panels.

8. The fast neutron nuclear reactor according to claim 1, further comprising at least one active attachment element configured to removably attach the thermal-insulating layer to the external wall of the reservoir, and to be activated on a command by a user to detach the thermal-insulating layer from the external wall of the reservoir whatever the temperature of the external wall.

9. The fast neutron nuclear reactor according to claim 1, the cold source comprising two separate reservoirs.

10. The fast neutron nuclear reactor according to claim 1, the at least one heat exchanger being divided into multiple tubes arranged in parallel in each reservoir and surrounded by the phase change material.

11. The fast neutron nuclear reactor according to claim 1, comprising a circulation loop including at least one branch hydraulically connecting the cold collector to an end of a monotube heat exchanger.

12. The fast neutron nuclear reactor according to claim 1, comprising at least one confinement building for confining each reservoir of the system for evacuation.

13. The fast neutron nuclear reactor according to claim 1, the heat-exchange liquid of the closed circuit being a liquid metal chosen from a binary lead-bismuth alloy or a binary sodium-potassium alloy.

14. The fast neutron nuclear reactor according to claim 1, the phase change material being chosen from lead, cadmium, zinc or a zamak zinc alloy, tin and its alloys with lead, or a ternary Li-Na-K carbonate mixture.

* * * * *